United States Patent [19]

Petersen et al.

[11] 4,372,413
[45] Feb. 8, 1983

[54] HYDROSTATIC STEERING DEVICE

[75] Inventors: Hans C. Petersen, Nordborg; Erik Kyster, Augustenborg; Svend E. Thomsen, Nordborg; Carl O. Flagstad, Sønderborg, all of Denmark

[73] Assignee: Danfoss A/S, Nordborg, Denmark

[21] Appl. No.: 204,180

[22] Filed: Nov. 5, 1980

[30] Foreign Application Priority Data

Nov. 7, 1979 [DE] Fed. Rep. of Germany ....... 2944883
Dec. 28, 1979 [DE] Fed. Rep. of Germany ....... 2952674

[51] Int. Cl.³ .............................................. B62D 5/08
[52] U.S. Cl. .................................... 180/152; 180/132; 91/467; 60/384; 137/625.23; 137/625.24
[58] Field of Search ....................... 180/152, 153, 132; 91/467; 60/384; 137/625.23, 625.24

[56] References Cited

U.S. PATENT DOCUMENTS

Re. 25,126  2/1962  Charlson .............................. 91/467
4,079,805   3/1978  Rau ..................................... 180/132

Primary Examiner—John A. Pekar
Attorney, Agent, or Firm—Wayne B. Easton

[57] ABSTRACT

The invention relates to a hydrostatic steering device comprising a servo-motor operable in dependence on direction and a control device having connections for a pump, a tank and the servo-motor as well as a valve arrangement which influences the flow of pressure medium from the pump to the servo-motor and from the latter to the tank and having two valve members which are relatively movable against the force of a neutral position spring depending on the comparison of the adjustment of a steering element and the follow-up motion of a metering motor.

4 Claims, 4 Drawing Figures

HYDROSTATIC STEERING DEVICE

In a known steering device of this kind (U.S. Pat. No. Re. 25,126) the first valve member consists of an inner rotary slide sleeve connected to a steering wheel and the second valve member consists of an outer rotary slide sleeve connected by way of a cardan shaft to the orbiting and rotating rotor of a metering motor. The valve arrangement forms a switching valve which is operable in dependence on direction, blocks the flow from the pump to the servo-motor and returns flow from the servo-motor to the tank in the neutral position, and when actuated switches the metering motor so that it is always disposed on the supply side of the servo-motor. This construction functions with lost motion in the region of the neutral position. The steering element and the first valve member connected thereto must always be turned out of the neutral position by a certain angle until communication is established between the pump and servo-motor because a certain minimum distance is required to achieve an adequate seal in the neutral position. If an external force acts on the servo-motor, this cannot be sensed by the driver of the vehicle and he will therefore take corrective measures only when a departure from the direction of travel becomes noticeable.

The invention is based on the problem of providing a hydrostatic steering device of the aforementioned kind which functions without lost motion and offers the possibility of enabling the driver to exert counter-control as soon as external forces act on the servo-motor.

This problem is solved according to the invention in that the valve arrangement comprises two pairs of throttles which are each disposed in series between the pump connection and tank connection and assume a central open position in the neutral position, that the first throttle of each one pair and the second throttle of each other pair are adjustable in the same sense to each other but in a sense opposite to the other two throttles, and that the metering motor with the servo-motor forms a fixed series circuit which is permanently connected between the junctions of both throttle pairs.

In this construction, adjustment of the steering element results in an opposite change of the pressure conditions at the junctions and thus directly to a pressure medium supply to the servo-motor. The latter is adjusted without any lost motion. If an external force acts on the servo-motor, a flow of pressure medium takes place through the metering motor which adjusts the valve so that the pressure conditions at the junctions are automatically varied in such a way that the external force is opposed by a higher pressure. Simultaneously, this adjustment of the valve causes the neutral position spring to be so loaded that the driver senses the external force and can immediately steer in the opposite direction by operating the steering element. Since the servo-motor responds immediately on operation of the steering element and, conversely, the driver can react immediately to an undesired adjustment of the servo-motor, the hydrostatic steering unit is also suitable for building into faster vehicles.

If very high pressure differences can occur between the two working chambers of the servo-motor, whether this be because the servo-motor drives a large load or high forces can act on the servo-motor, the amount of leakage passing from one working chamber to the other can increase to such an extent that it is no longer negligible. This is significant because the metering motor is installed at a fixed position in one of the conduits leading to the servo-motor. If it is on the downstream side, the follow-up motion is slower than if it is on the upstream side. The impulses transmitted to the steering element are also of different sizes with oppositely acting forces exerted on the servo-motor. This difficulty can be remedied in that the servo-motor with associated control device is duplicated, that the movable parts of the servo-motors and the first valve members of the control devices are inter-coupled, that the metering motors in both control devices are so connected that one is always disposed on the inlet side and the other on the outlet side of the associated servo-motor, and that the two working chambers of a servo-motor are so designed that their volumes change by equal amounts. In this way one ensures that the same conditions obtain in both operating directions because, by reason of the coupling of the two first valve members by way of the steering element, a metering motor on the inlet side and on the outlet side will always be responsible for the following motion of the two valve members.

If each servo-motor with associated control device is associated with its own pump, one obtains a system with two suppressed pressure medium circuits. This leads to a high degree of safety because if one component fails in one circuit, the other circuit will still be fully operative.

In another embodiment, it is ensured that the series circuit comprises two interconnected servo-motors of which the first connections associated with oppositely acting working chambers are each connected to one junction and the metering motor is connected between the second connections.

In this construction, symmetrical conditions are obtained with regard to the two actuating directions. The metering motor is traversed by the amount of pressure medium which passes from the one servo-motor to the other or vice versa. Irrespective of the direction of flow and of the forces to be overcome by the servo-motors, the metering motor remains substantially at the same pressure level because on adjustment of the valve arrangement from the neutral position the pressure at the one junction rises and the pressure at the other junction drops. Consequently, the leakage losses of this metering motor are substantially the same for all operating conditions. A particular adjusting movement of the steering element in the one or other direction always leads to a particular adjustment of the servo-motors.

Advantageously, the servo-motors comprise differential pistons and the working chambers associated with the smaller pressure face are interconnected by way of the metering motor. As a result, the amount of pressure medium passing through the metering motor is smaller than the amount conveyed by the pump, i.e. use can be made of a smaller metering motor than under the otherwise same conditions.

With particular advantage, each second connection of a servo-motor is connected to the tank by way of a check valve opening towards it and to the first connection of the other servo-motor by way of a spring-influenced check valve opening away from it. In this way it is possible to employ constructions in which the changes in volume in the working chambers of smaller pressure area of the two servo-motors are not exactly the same, whether by reason of different manufacturing tolerances or because of the selected connection between the two servo-motors. If the volume of the working chamber of the downstream servo-motor changes more rapidly than that of the upstream servo-motor, liquid can be sucked from the tank through the first-mentioned check valve. On the other hand, if the volume changes more slowly, pressure fluid can be diverted from the working chamber of the upstream servo-motor to the junction of lower pressure by way of the spring-influenced check valve. The spring force of the check valve should be designed so that the valve will only open at a pressure difference larger than the pressure produced by the metering motor when the latter is driven as a pump by the moment of the neutral position spring of the valve arrangement, i.e. the metering motor cannot operate as a pump with the mutual adjustment of the valve members occurring during normal operation.

It is also favourable to have a position of end stops so that the differential piston of each first servo-motor in the direction of flow is supportable by it. In this way one ensures that the pressure level of the metering motor still drops on reaching the end stop and the leakage losses can be kept correspondingly low. If the end stop were to be associated with the following servo-motor, the pressure level of the servo-motor would rise.

Further, the pump connection of the control device may be preceded by a check valve opening towards it. This makes emergency control operation simpler. If the pump fails then, with the aid of the metering motor which is actuated by the steering element and serves as an emergency pump, the one servo-motor can be fed by way of the second connection and the other servo-motor can be fed by way of the one spring-influenced check valve and the first connection, so that the sum of the piston areas in the associated working chambers is subjected to pressure. On the pressure side, the check valve blocks a leakage path which could lead through the pump.

In a preferred embodiment, the two first throttles comprise at least one common control orifice connected to the pump connection and the two second throttles comprise at least one common control orifice connected to the tank connection and these control orifices each cover a web between two adjacent chambers which are offset in the direction of relative motion and respectively connected to the metering motor and the other servo-motor connection and also cover part of these chambers. This results in a particularly simple construction because one control orifice is in each case common to two throttles and the increase in cross-section of the one throttle necessarily leads to a reduction in the cross-section of the other throttle.

Constructionally, this can be achieved in that the valve member comprises at least three parallel grooves which are offset in the direction of relative motion and extend transversely thereto and which are alternately connected to the metering motor and the other servo-motor connection, and that at least one groove is covered by part of a common control orifice of the first throttles as well as by part of a common control orifice of the second throttles. This permits one to obtain motion of the four throttles in the same and opposite directions in a simple manner.

A particularly simple construction is obtained by using a control device in which in a housing bore the inner sleeve of a rotary slide forms the first valve member and its outer sleeve forms the second valve member, the inner sleeve having parallel grooves on the outside, the outer sleeve having on two circumferential lines apertures forming the common control orifices of the throttles, and the housing bore having annular grooves along the circumferential line connected respectively to the pump connection and tank connection.

The invention will now be described in more detail with reference to preferred example shown in the drawing, wherein.

Figure 1:
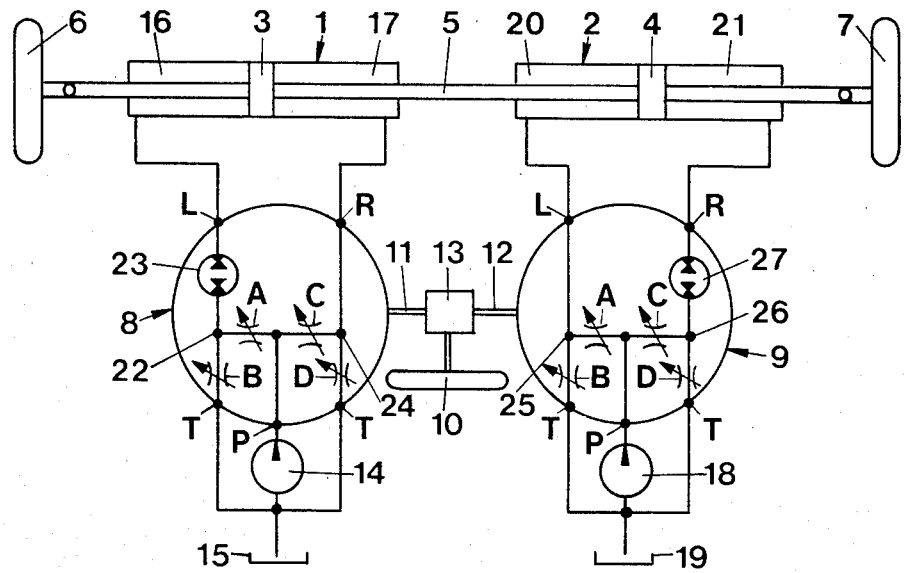
FIG. 1 is a diagrammatic representation of a steering device according to the invention.

FIG. 1 shows two servo-motors 1 and 2 of which the pistons 3 and 4 are connected by a common piston rod 5 and can, for example, adjust two wheels 6 and 7 that are to be steered.

Further, there are two control devices 8 and 9 which are operable with the aid of a common steering element 10. For this purpose, the two input shafts 11 and 12 are interconnected and connected to the steering element 10 by way of a coupling apparatus 13. The control device 8 has a pump connection P connected to a pump 14, two tank connections T connected to a tank 15, a servo-motor connnection L connected to the left-hand working chamber 16 of the servo-motor 1, and a servo-motor connection R connected to the right-hand working chamber 17 of this servo-motor. Similarly, the control device 9 has a pump connection P connected to a pump 18, a tank connection T connected to a tank 19, a servo-motor connection L connected to the left-hand working chamber 20 of the servo-motor 2, and a servo-motor connection R connected to the right-hand working chamber 21.

Each control device has four throttles A–D which form two series circuits between the pump connection P and the tank connection T. The throttles A and D are adjusted in the same sense but oppositely to the throttles B and C. The junction 22 between the throttles A and B of the control device 8 is connected by way of a metering motor 23 to the servo-motor connection L and the junction 24 between the throttles C and D is connected direct to the servo-motor connection R. In the control device 9 on the other hand, the junction 25 between the throttles A and B is connected direct to the servo-motor connection L and the junction 26 between the throttles C and D is connected to the servo-motor connection R by way of a metering motor 27.

Figure 2:
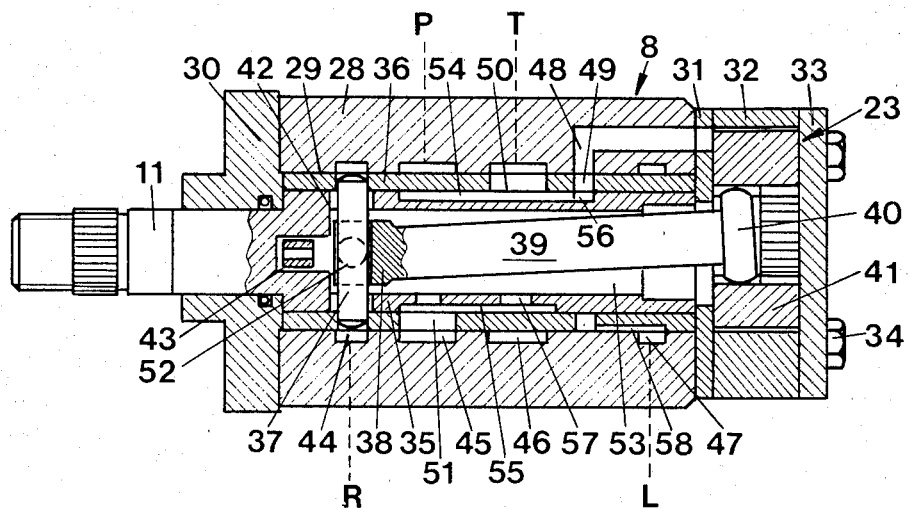
FIG. 2 is a longitudinal section through a control device that can be used according to the invention.

The control device 8 is shown in longitudinal section in FIG. 2. A housing has a central member 28 with a bore 29, an end bearing plate 30, an intermediate plate 31 at the other end, an internally serrated gear ring 32 as the stator of the metering motor 23, and a cover plate 33, it being possible to hold these parts together by screws 34. The input shaft 11 is made in one piece with an inner sleeve 35. Between it and the housing bore 29 there is an outer sleeve 36. The latter is connected by way of a transverse pin 37 to the one head 38 of a cardan shaft 39 of which the other head 40 is connected to turn with an externally serrated gear 41 which forms the rotor of the metering motor 23. The inner sleeve 35 forms a first valve member connected to the steering element 10 and the outer sleeve 36 forms a second valve member connected to the metering motor 23. Both are relatively rotatable to a certain extent defined by the play of the pins 37 in a bore 42 in the inner sleeve 35, relative rotation being against the force of a neutral position spring 43 which is formed by two leaf springs passing through both sleeves.

Several annular grooves are provided in the housing. One annular groove 44 is connected to the servo-motor connection R, an annular groove 45 is connected to the pump connection P, an annular groove 46 is connected to the tank connection T and an annular groove 47 is connected to the servo-motor connection L. Bores 48 extending from between the annular grooves 46 and 47 in conjunction with bores 49 in the outer sleeve 36 form a distributor valve which leads pressure fluid to and from the compression chambers of the metering motor 23. The outer sleeve 36 is additionally provided with two rows of control orifices 50 and 51 formed by bores as well as with bores 52 which are aligned with further bores 42 in the inner sleeve 35 and in this way establish communication between the annular groove 44 and the interior 53 of the inner sleeve 35. Grooves 54 and 55 are alternately provided in the inner sleeve parallel to the axis. The groove 54 extends from the bore 51 up to the bore 49 and merges with an annular groove 56. The groove 55 extends only between the bores 50 and 51 but is connected to the interior 53 by way of apertures 57. In addition, the outside of the outer sleeve 36 is provided with axials grooves 58 which connect the bores 49 to the annular groove 47.

Figure 3:
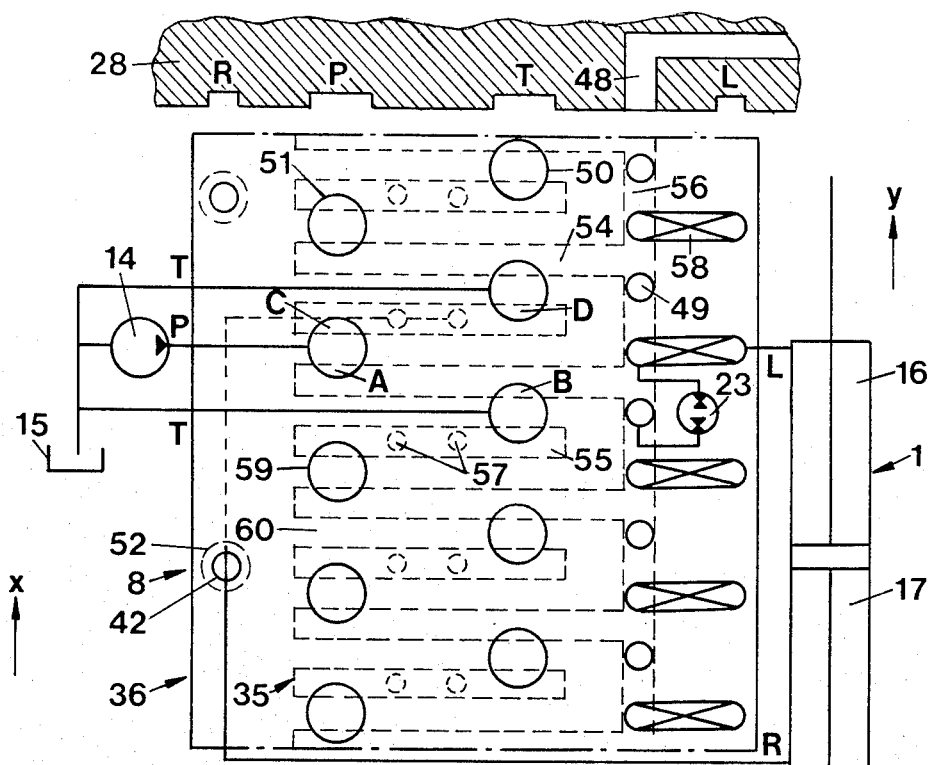
FIG. 3 shows the FIG. 1 device with a diagrammatic development of the valve arrangement in both control devices.
Figure 3:
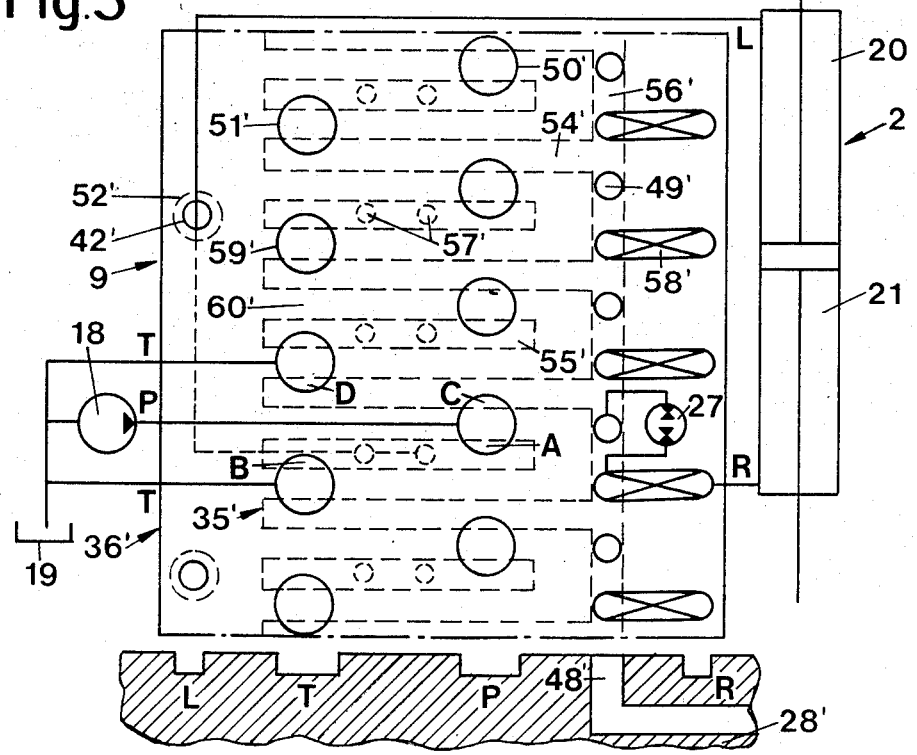

FIG. 3 shows developments of the valve arrangement of the control devices 8 and 9 in conjunction with associated components. The reference numerals employed in FIG. 2 for the control device 8 are repeated but with an apostrophe in the case of the control device 9. The full lines show the recesses in the outer sleeve 36 and the broken lines show the recesses in the inner sleeve 35. It will be seen that the grooves 54 and 55 are at equal intervals and separated by webs 59 and 60. The control orifices 51 cover the web 59 and parts of the grooves 54 and 55. They therefore form the first throttles A and C. The control orifices 50 cover the web 60 and parts of the grooves 54 and 55. They therefore form the second throttles B and D. The same applies to the control device 9 except that the control orifices 50' are common to the throttles A and C and the control orifices 51' are common to the throttles B and D.

Consideration will first be given to the function of the control device 8. In the neutral position shown in FIG. 3, all throttles A–D have the same throttling resistance. The same pressure therefore obtains at the junctions 22 and 24. Accordingly, the servo-motor 1 is locked under pressure. If, now, the inner sleeve 35 is turned in the direction of the arrow X by the steering element 10 acting through the input shaft 11, the throttles A and D will open whilst the throttles B and C will close. The pressure at the junction 22 rises and the pressure at the junction 24 drops. Pressure medium therefore flows to the servo-motor 1 by way of the metering motor 23. This takes place without the delay of lost motion. The outer sleeve 36 is made to follow in the direction of the arrow X by the metering motor 23 until the neutral position has been reached again. The same applies when the steering element 10 is turned in the opposite direction. In this case the metering motor 23 is turned in the opposite direction by the pressure medium compressed in the working chamber 16. If, now, an external force acts on the servo-motor 1 in the direction Y, the pressure in the working chamber 16 rises in relation to the pressure at the junction 22. Pressure medium is therefore led to the tank by way of the metering motor 23. Consequently, the outer sleeve 36 turns opposite to the direction X. This leads to an enlargement in cross-section at the throttles A and D and to a reduction in cross-section at the throttles B and C. The pressure at the junction 22 therefore rises whereas that at the junction 24 drops. A higher resistance therefore already opposes the external force. At the same time, however, the rotated outer sleeve 36 transfers an impulse onto the inner sleeve 35 by way of the neutral position spring 43, which impulse is sensed by the driver of the vehicle at the steering element 10. He can therefore immediately exert control in the opposite direction, whereby the pressure at the junction 22 is increased further and the error in the course caused by the external force can be corrected.

If the external force acts in the opposite direction, the conditions are similar because the pressure in the working chamber 16 drops in relation to the pressure at the junction 22 and pressure medium therefore flows through the metering motor 23 in the supply direction, whereby the outer sleeve 36 is so adjusted that the throttles B and C open further but the throttles A and D close, so that a higher pressure builds up at the junction 24. In this direction of rotation the steering element 10 again receives an impulse.

If the leakage losses passing from the working chamber 16 to the working chamber 17 or vice versa are not negligible, one can ensure with the aid of the control device 9 that metering of the pressure fluid in each direction of actuation and for every desired external force influence takes place in the same manner because one metering motor will always be disposed on the supply side and another metering motor on the outlet side.

On failure of a component in one of the two circuits, the other circuit is adapted to maintain a power-assisted emergency control operation. In cases where this is superfluous, one can also work with a common pump for both circuits. On failure of both pumps, emergency control operation is still possible by manual force.

Figure 4:
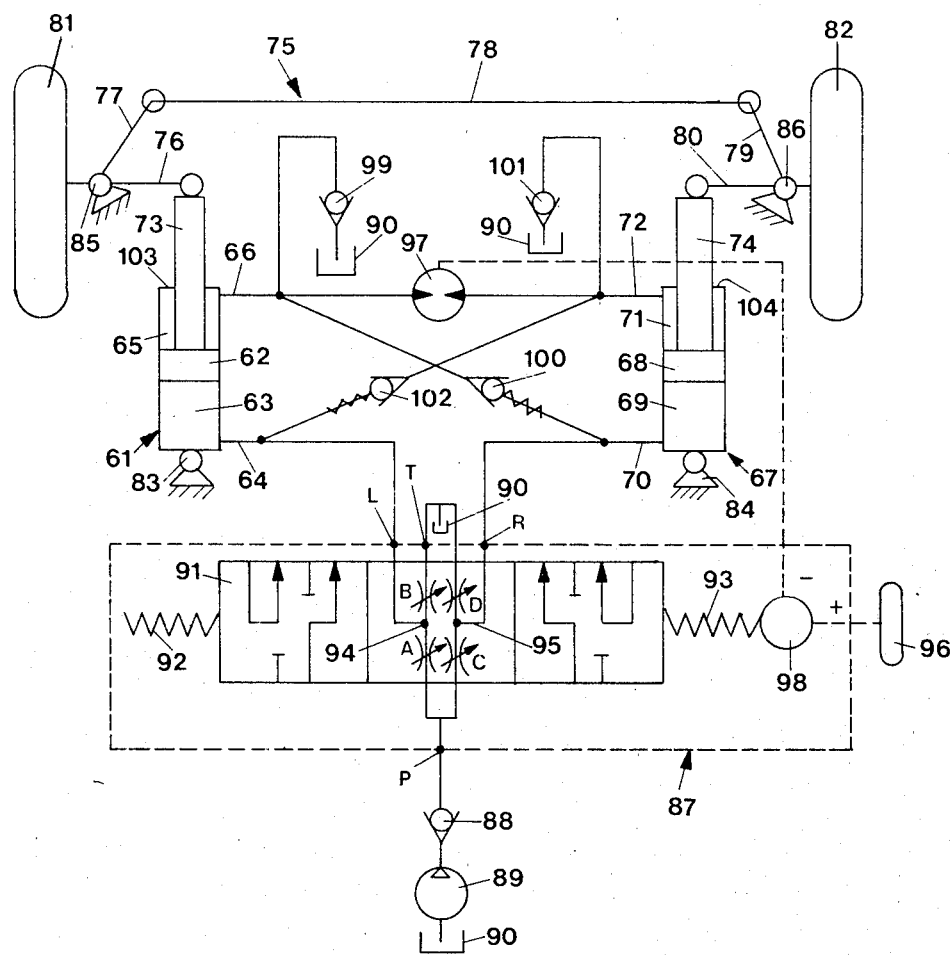
FIG. 4 is a block circuit diagram of a different embodiment.

In the example of FIG. 4, a first servo-motor 61 comprises a differential piston 62 which separates a working chamber 63 of larger pressure area with a first connection 64 from a working chamber 65 of smaller pressure area with a second connection 66. A second servo-motor 67 comprises a differential piston 68 which separates a working chamber 69 of larger pressure area with a first connection 70 from a working chamber 71 of smaller pressure area with a second connection 72. The two piston rods 73 and 74 are interconnected by a linkage 75 which consists of the interhinged struts 76, 77, 78, 79 and 80 and serves to adjust two wheels 81 and 82. Provision is made for a stationary hinge bearing for the servo-motor 61, a stationary pivotal bearing 84 for the servo-motor 67, a stationary pivotal bearing 85 for the wheel 81 and a stationary pivotal bearing 86 for the wheel 82.

A control device 87 has a pump connection P which is connected to a pump 89 by way of a check valve 88, a tank connection T connected to a tank 90 and two servo-motor connections L and R connected to the first connections 64 and 70, respectively, of the servo-motors 61 and 67, respectively. The control device 87 comprises a valve arrangement 91 which can be adjusted from a neutral position defined by neutral position springs 92 and 93 into one of two operative positions each associated with one direction of flow. The valve arrangement comprises four throttles A to D which form two series circuits between the pump connection P and tank connection T. The throttles A and D are adjusted in the same sense but opposite to the throttles B and C. The junction 94 between the throttles A and B is connected to the servo-motor connection L and the junction 95 between the throttles C and D is connected to the servo-motor connection R. In the one extreme position, the throttles A and D are closed and the throttles B and C fully open. In the other extreme position, the last-mentioned throttles are closed and the throttles A and D are fully open. To adjust the valve arrangement, there is a steering element 96 in the form of a manual wheel. The return element is a metering motor 97 connected between the second connections 66 and 72 of the servo-motors 61 and 67. It is shown diagrammatically that the steering motion and return motion are compared in a comparator 98 and the valve arrangement is adjusted in relation thereto. A practical example of such a valve arrangement is shown in FIGS. 2 and 3 hereof (except the connection of the metering motor). It follows that the steering element 96 adjusts a first valve member and the metering motor 97 adjusts a second valve member and the desired comparison takes place in this way. The second connection 66 of the servo-motor 61 is connected to the tank 90 by way of a check valve 99 and to the first connection 70 of the servo-motor 67 by way of a spring-influenced check valve 100. The second connection 72 of the last-mentioned servo-motor is connected to the tank 90 by way of a check valve 101 and to the first connection 64 of the servo-motor 61 by way of a spring-influenced check valve 102.

This results in the following manner of operation. In the neutral position, the same pressure obtains at the junctions 94 and 95. The two servo-motors 61 and 67 are therefore pressure-locked. If, now, the valve arrangement is adjusted towards the left, the pressure at the junction 94 rises whereas the pressure at the junction 95 drops. Consequently, the differential piston 62 moves upwardly and the differential piston 68 moves downwardly whereas the pressure fluid flows from left to right through the metering motor 97. This takes place without the delay of a lost motion. On rotation of the steering element 96 in the opposite direction, the conditions are the same but with reverse direction of movement, the metering motor 97 being traversed from right to left. Since about the same pressure drop can be expected at both servo-motors, the pressure level of the metering motor 97 approaches the pressure at the junctions 94 and 95 in the neutral position.

If an external force acts on the wheels seeking to push the piston rod 73 downwardly and the piston rod 74 upwardly, a corresponding amount of pressure fluid flows from right to left by way of the metering motor 97 so that the driver will sense a corresponding impact on the steering element 96 and can make a counter-correction. The same applies if the force acts on the wheels in the reverse direction.

It will be assumed that the adjustment takes place so that the servo-motor 67 is downstream of the servo-motor 61. If the working chamber 71 increases more rapidly than the reduction of the working chamber 65, fluid can be sucked through the check valve 101. On the other hand, if the working chamber 71 increases more slowly than the working chamber 65 is reduced, the excess pressure fluid can be diverted through the check valve 100 to the junction 95 of lower pressure. One need therefore never expect cavitation or overloading. The same applies during adjustment in the opposite direction.

In emergency operation, when the pump 89 has failed, adjustment can be effected with the aid of the metering motor 97 which now acts as an emergency pump. It is assumed that it is operated by means of the hand wheel 96 so that pressure fluid is conveyed from left to right. Part of the pressure fluid will then reach the working chamber 71 of the servo-motor 67 and another part will reach the working chamber 63 of the servo-motor 61 by way of the check valve 102. The two servo-motors operate in parallel so that a comparatively large pressure area is available, which simplifies manual actuation, albeit at the expense of the rotary speed of the steering element 96. The metering motor 97 is fed from the working chamber 65 by way of the check valve 99. The fluid from the working chamber 69 can be diverted to the tank 90 by way of the throttle D.

The upper abutments 103 for the differential pistons 62 and the abutments 104 for the differential pistons 68 are so arranged that the piston of the upstream servo-motor reaches this abutment earlier than the piston of the downstream servo-motor reaches the opposite end of the cylinder. If, therefore, the differential piston 62 is pushed upwardly, it reaches the abutment 103 earlier than the piston 68 reaches its lower limiting position. This ensures that the metering motor 97 does not undergo an undesirable pressure rise by an end stop of the downstream piston that is too early.

We claim:

1. A hydraulic steering control system comprising a bidirectional servomotor having two operating ports on opposite sides thereof; pump and tank means; manually operable steering control means; a metering control unit having a housing, shaft means connected to said steering control means journaled in said housing, metering motor means in said housing, first and second relatively rotatable valve means connected respectively to said shaft means and said metering motor means, spring means between said first and second valve means, said housing and valve means having supply port means connected to said pump means and first and second exhaust port means connected to said tank means, said housing and valve means having first and second control port means connected to said servomotor operating ports, flow path means including first and second supply branches having fluid communication with said supply port means, said flow path means including (1) first control and exhaust branches connected to said first supply branch and respectively to said first control and exhaust port means and (2) second control and exhaust branches connected to said second supply branch and respectively to said second control and exhaust port means, said metering motor means being in one of said control branches, throttling valve means in said flow path means between said first and second relatively rotatable valve means including a first pair in said first supply and second exhaust branches and a second pair in said second supply and first exhaust branches, said first and second pairs of throttle valve means acting oppositely from partially closed neutral positions towards fully opened or fully closed positions in response to the turning of said shaft in one direction or the other.

2. A hydraulic steering control system according to claim 1 wherein said metering motor means is in said first control branch.

3. A hydraulic steering control system according to claim 1 wherein said metering motor means is in said second control branch.

4. A hydraulic steering control system according to claim 1 including a second bidirectional servomotor having two operating ports on opposite side thereof, said first named and said second servomotor having common shaft means, a second metering control unit the same as said first named metering control unit in the stated respects, said steering control means being connected to the corresponding said shaft means of said second metering control unit for rotation thereof in the opposite direction, said second metering control unit having its corresponding said supply port connected to said pump means and its corresponding first and second exhaust port means connected to said tank means, said second metering control unit having its corresponding first and second control port means connected to said operating ports of said second servomotor, said metering motor means of said first named metering control unit being in said first control branch thereof and the corresponding metering motor means of said second metering control unit being in the corresponding second control branch thereof so that said metering motor means always act jointly and oppositely in metering fluid supplied to and exhausted from said first named and said second servomotors.

* * * * *